United States Patent

[11] 3,633,005

[72] Inventor Howard N. Leighton Rockville, Md.
[21] Appl. No. 14,416
[22] Filed Feb. 26, 1970
[45] Patented Jan. 4, 1972
[73] Assignee International Business Machines Corporation Armonk, N.Y.

[54] FOUR QUADRANT MULTIPLIER USING A SINGLE AMPLIFIER IN A BALANCED MODULATOR CIRCUIT

5 Claims, 3 Drawing Figs.

[52] U.S. Cl. 235/150.52, 235/194, 325/138
[51] Int. Cl. G06j 1/00, G06g 7/16
[50] Field of Search 235/150.52, 150.51, 150.53, 150.5, 194; 328/133, 160, 161; 325/138, 397, 400; 307/229, 230

[56] References Cited

UNITED STATES PATENTS

| | | | |
|---|---|---|---|
| 3,384,840 | 5/1968 | Holsinger | 325/138 X |
| 3,484,589 | 12/1969 | Jernakoff | 235/150.52 |
| 3,469,080 | 9/1969 | Schmid et al. | 235/150.52 |
| 3,484,595 | 12/1969 | Krips | 235/194 |
| 3,013,724 | 12/1961 | Thompson et al. | 235/194 |
| 3,324,416 | 6/1967 | Hoag et al. | 325/138 X |
| 3,389,327 | 6/1968 | Fine et al. | 325/138 X |
| 3,473,043 | 10/1969 | James | 235/194 X |
| 3,525,860 | 8/1970 | Barber | 235/194 X |

*Primary Examiner*—Joseph F. Ruggiero
*Attorneys*—Hanifin and Jancin and Victor Siber

ABSTRACT: A multiplier circuit, having a relatively constant input impedance, capable of multiplying a positive or a negative input signal by a gain which is variable from a positive to a negative value by varying one control impedance. The input signal is applied to a reference input and to a signal input which includes a feedback path to provide both positive and negative products without the need for additional sign circuits or complimentary signals. The multiplier circuit can be adapted for use as a balanced modulator by providing an analog input signal and switching the control impedance between two different impedance values with a binary carrier signal.

INVENTOR
HOWARD N LEIGHTON

BY Victor Silen
AGENT

A FOUR QUADRANT MULTIPLIER USING A SINGLE AMPLIFIER IN A BALANCED MODULATOR CIRCUIT

BACKGROUND OF THE INVENTION

This invention relates to a digital/analog multiplier. MOre particularly, it relates to a digital/analog multiplier which is used in a balanced modulator circuit.

Some prior art D/A multiplier devices have utilized an operational amplifier for the purpose of multiplying two signals. These types of devices generally achieve multiplication by the control of a resistance which is at one of the inputs to the operational amplifier. In this type of device, utilization is made of the constant gain of the operational amplifier.

In order to take into account the requirements of multiplying a positive or negative quantity, in the prior art, it has been found necessary to include both the 0° and the 180° phase of either the multiplicand or multiplier signals.

Another approach is to carry a particular sign bit along with the digital information and to supply the binary data in its complement form for multiplication. Examples of these techniques are discussed in the text, Electronic Analog and Hybrid Computers, by Korn, C. A. and Korn, T. M., McGraw-Hill Book Co., 1964.

The D/A multiplier as a basic unit, has many uses in electronic circuit design. One of these is to use the multiplier as a balanced modulator. In many types of communication systems, it is desirable to transmit continuously at the full power that may be produced by the transmitter. This is particularly true in the case of binary coded systems. One type of modulation which is often used to achieve this full power requirement is suppressed carrier amplitude modulation or balanced modulation. This class of modulation is accomplished by a D/A multiplier that provides the product of an analog signal waveform and a binary carrier signal. Since balanced modulation requires that the analog signal be multiplied by both positive and negative quantities, the D/A multiplier in the modulator embodiment is presented with the problems of sign manipulation mentioned above.

Therefore, it is an object of the present invention to provide an improved balanced modulator circuit.

It is a further object of the present invention to make an improved balanced modulator with a more efficient digital/analog multiplier which utilizes an operational amplifier.

Another object of the present invention is to make a digital/analog multiplier having a gain which can vary from plus to minus depending on the control of an input resistance without having separate sign control means.

SUMMARY OF THE INVENTION

In the present invention a D/A multiplier is provided which is capable of multiplying an analog voltage by a coefficient that is determined by a digital binary signal. The digital/analog product is accomplished by introducing the analog signal into an operational amplifier. The digital signal is used to control an impedance component connected between the inverting input of the operational amplifier and ground.

When the operational amplifier is incorporated in a balanced modulator circuit, the variable impedance input to the operational amplifier is switched in and out of the circuit by a carrier signal. Then, the output signal from the operational amplifier results in a product of the analog input signal and the condition of the switched or variable impedance input to the operational amplifier.

Balanced modulation is achieved by the fact that the gain of the operational amplifier varies from +0.5 when the variable impedance is switched in, to −0.5 when the impedance is switched out of the circuit. These gain values are designed by a specific choice of feedback impedance relative to the input impedances.

DESCRIPTION OF THE INVENTION

Figure 1:
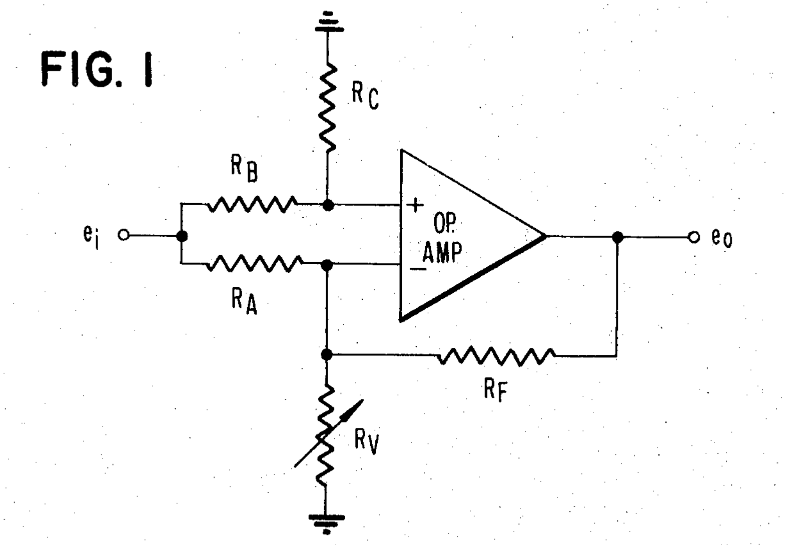
FIG. 1 is a schematic circuit diagram of the basic D/A multiplier circuit.

The basic D/A multiplier circuit is shown in FIG. 1. The input waveform to the multiplier is shown in FIG. 1 by the symbol $e_i$. It is this signal $e_i$ that is multiplied by a digital signal which controls the value of variable control impedance $R_v$ (control means not shown in FIG. 1). Multiplication resistance $R_v$ can be implemented in many ways.

Some examples are, a field effect or bipolar transistor biased to operate as a voltage-variable resistor, a light-controlled resistor, a servo-controlled potentiometer, or a switched parallel array of resistors. Also, an array of parallel resistors may be switched by contacts, transistor choppers or other well-known devices. While this disclosure concerns itself with the use of switched resistors as the $R_v$ component, it will be recognized by those skilled in the art that other devices may be used in their place. The input waveform $e_i$ passes through input impedance $R_A$ to the negative input to the operational amplifier, and through reference input impedance $R_B$ to the positive input of the operational amplifier. The positive input of the operational amplifier is also connected to reference impedance means $R_C$ which is, in turn, connected to a ground reference potential. The negative input of the operational amplifier is connected to a feedback impedance $R_F$ and to a variable impedance means $R_v$ previously discussed. The feedback impedance $R_F$ is, in turn, connected to the output of the operational amplifier and the variable impedance $R_v$ is connected to a ground reference potential.

THEORETICAL ANALYSIS

The schematic circuit diagram in FIG. 1 shows the D/A multiplier which may operate independent of the sign of the multiplier input. The gain of the circuit in FIG. 1 may be represented as:

$$e_o/e_i = A_v = \text{voltage gain} \qquad (1)$$

$$A_v = \frac{R_C}{R_B + R_C}\left[\frac{R_F}{R_V} + \frac{R_F}{R_A} + 1\right] - \frac{R_F}{R_A} \qquad (2)$$

Then if: $R_B = R_C$ $$A_v = \frac{1}{2}\left[\frac{R_F}{R_V} - \frac{R_F}{R_A} + 1\right] \qquad (3)$$

From the gain equation 3 it is seen that a number of useful results may be obtained by controlling the variables in the equations. Specifically, the ratios of $R_F/R_V$ and $R_F/R_A$ may be selected to vary the gain $A_v$ from positive to negative values.

D/A BALANCED MODULATOR

Figure 2:
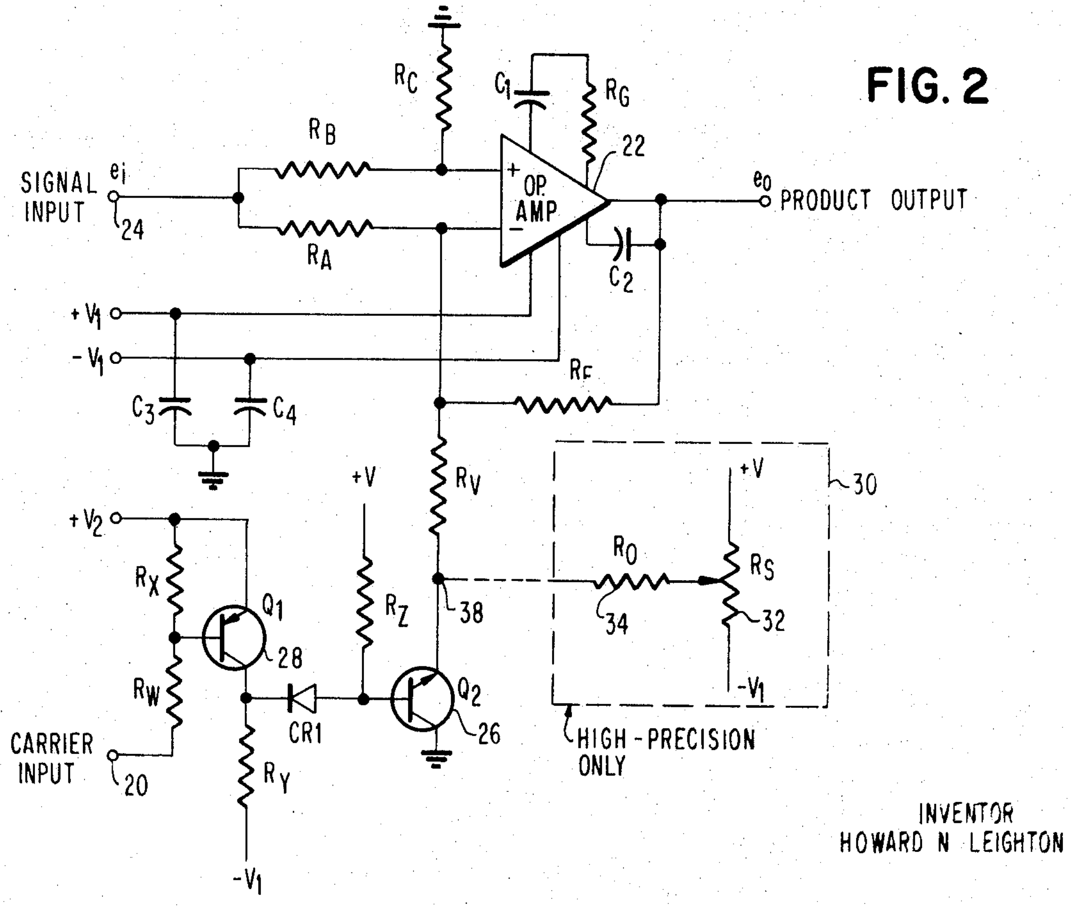
FIG. 2 is a schematic circuit diagram of the D/A multiplier used in a balanced modulator embodiment.

Referring now to FIG. 2, there is shown a balanced modulator circuit embodiment of the invention. As indicated previously, a balanced modulator multiplies an analog signal by a square wave carrier. Thus, in order to provide for balanced modulation, the multiplier weight of the circuit must vary between a positive value and an equal negative value depending on the specific binary carrier level. Relating this requirement to the D/A multiplier circuit of FIG. 2, it is seen that balanced modulation may be achieved by letting $A_v$ equal +0.5 when the binary carrier input equals 0 and $A_v$ must equal −0.5 when the binary input is equal to 1. This gain relationship is achieved by choosing the following relationships of the variables in the gain equation 3:

$R_A = R_F/2$ $R_A = R_F/2$ (when binary carrier input = 0)

$R_V = \infty$ (when binary carrier input = 1)

then, $A_V = +0.5$ (when binary carrier input = 0)

$A_V = -0.5$ (when binary carrier input = 1)

By applying these conditions, the circuit of FIG. 2 may be operated as a balanced modulator where the binary input is a square wave carrier and is introduced into input 20. The operational amplifier 22 amplifies the analog signal input introduced at terminal 24 by a constant that is determined by the resistors $R_A$, $R_B$, $R_C$, $R_F$, and $R_V$. Then, in order to control the gain of the amplifier 22, the effective value of $R_V$ is switched in and out of the circuit by means of a carrier driven chopper transistor 26 which receives a carrier input that has been inverted by transistor 28. As can be seen by reference to FIG. 2, transistor 26 is operated in the inverted mode and therefore when transistor 26 is in an "on" condition, the resistance between its emitter and collector is very low providing an effective resistance between the negative input of operational amplifier 22 and ground reference potential of $R_V$. When transistor 26 is in an "off" condition, the impedance between the emitter and collector of transistor 26 approaches infinity therefore the total impedance between the negative input of operational amplifier 22 and ground reference potential approaches infinity. If the resistance of resistor $R_F$ is chosen to be twice the resistance of resistor $R_V$, the expression within the brackets in the equation below will go from plus one to minus one, as transistor 26 goes from "on" "off" condition. The specific gain expression with respect to the circuit of FIG. 2 is as follows:

$$A_v=\frac{1}{2}\left[\frac{R_F}{R_V}-1\right]$$

$$=\begin{cases}+0.5 \text{ (when chopper transistor 26 is ON)}\\ -0.5 \text{ (when chopper transistor 26 is OFF)}\end{cases}$$

Referring again to FIG. 2, it is seen that this circuit may be operated in either a low-precision or high-precision mode. In the low-precision version the circuit 30 would not be included within the modulator unit. One possible use of a low-precision balanced modulator is when it is used as a synchronous detector and the multiplier provides the product of two identical frequencies, thus, a precise carrier and signal balance would not be required.

In the high-precision version, potentiometer 32 and resistance 34 are included within the circuit to provide an offset current which compensates for the offset voltages of transistor 26 and operational amplifier 22. By introducing the offset current at contact point 38, the chopper transistor 26 automatically switches the compensation between two desired values.

NINE-BIT D/A MULTIPLIER EMBODIMENT

Figure 3:
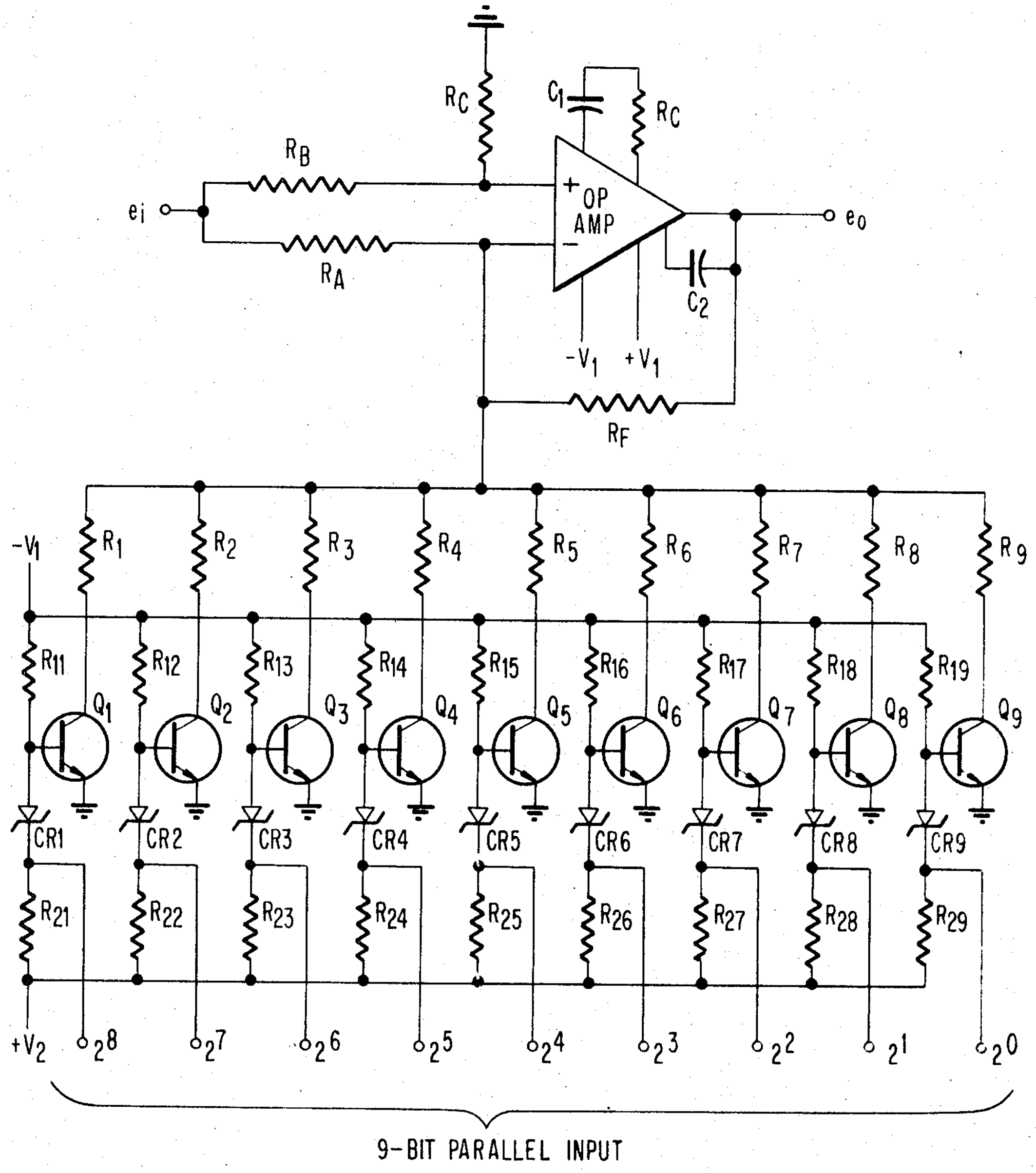
FIG. 3 is a schematic representation of a nine-bit D/A multiplier circuit.

Referring now to FIG. 3, there is shown a nine-bit multiplier which includes the D/A multiplier of FIG. 1 and a group of switching transistors that provide 512 possible combinations of the variable $R_v$. While the disclosed embodiment in FIG. 3 shows switching transistors, it should be recognized that other types of switches may be substituted in their place.

In order to provide a conventional multiplier, it is generally known that $A_{v\ max}$ must be equal to $-A_{v\ max}$. Referring to the multiplier of FIG. 1, if the value of $R_F/R_A$ equals 2, then the gain equation 3 reduces to the following:

$$A_v=\frac{1}{2}\left[\frac{R_F}{R_V}-1\right]$$

Then, if $R_v$ is constrained to the range $0.5R_F\ R_V\ \infty$, then the corresponding range of gain is $0.5>A_V\ -0.5$. From this relationship it is seen that the specific resistance ratios chosen permit reversing the sign of the gain $A_v$ as well as varying the absolute value of $A_v$ without requiring the conventional two complimentary inputs as practiced in the prior art.

In order to provide for a nine-bit multiplier, the values of the resistors $R_1$ through $R_9$ in FIG. 3, are chosen to permit the gain to be increased in 512 equal increments from –0.5 to +0.5 depending on the binary value of the nine-bit parallel binary word. That is, the nine-bit word will vary from 000000000 to 111111111. In order to achieve this objective the required resistor ratios are as follows:

| | | | |
|---|---|---|---|
| $R_A=0.5R_F$ | $R_2=2R_F$ | $R_5=16R_F$ | $R_8=128R_F$ |
| $R_B=R_C$ | $R_3=4R_F$ | $R_6=32R_F$ | $R_9=256R_F$ |
| $R_1=R_F$ | $R_4=8R_F$ | $R_7=64R_F$ | |

It is significant to note that the ratios relative to $R_F$ have a critical effect on accuracy, but the absolute value of this resistance is not critical. The equivalent resistance, $R_V$, which consists of the parallel resistors $R_1$ through $R_9$, may be expressed as a function of $m$ as follows:

$$R_V(m)=256R_F/m$$

where $m$ = decimal value of nine-bit parallel binary multiplier word. Then, the gain equation 3 reduces to the following expression:

$$A_v(m)=\frac{1}{2}\left[\frac{m}{256}-1\right]$$

This gain expression is better understood by referring to table 1 which indicates the resistance and gain variables depending on the binary value of the nine-bit word.

TABLE 1

| 9-bit word | $m$ | Rv | Av |
|---|---|---|---|
| 000000000 | 0 | $\infty$ | $-\frac{256}{512}$ |
| 000000001 | 1 | $\frac{256}{1}R_F$ | $-\frac{255}{512}$ |
| 000000010 | 2 | $\frac{256}{2}R_F$ | $-\frac{254}{512}$ |
| . | . | . | . |
| . | . | . | . |
| 011111111 | 255 | $\frac{256}{255}R_F$ | $-\frac{1}{512}$ |
| 100000000 | 256 | $R_F$ | 0 |
| 100000001 | 257 | $\frac{256}{257}R_F$ | $+\frac{1}{512}$ |
| . | . | . | . |
| . | . | . | . |
| 111111111 | 511 | $\frac{256}{511}R_F$ | $+\frac{255}{512}$ |

It is recognized that the switching transistors Q1 through Q9 may deviate from the ideal switch in terms of their resistances when they are in the on state. However, by proper selection of the transistors, values as represented in the table may be substantially achieved.

While the invention has been particularly shown and described with reference to the preferred embodiments thereof, it will be understood by those skilled in the art that various changes in form and details may be made therein without departing from the spirit and scope of the invention. For example, the circuit of FIG. 3 may be modified to perform D/A amplitude modulation. This may be achieved by letting $R_A=R_F/3$. Then, if the other impedances are unchanged, the circuit becomes useful as an amplitude modulator, where $e_i$ is the carrier and the nine-bit parallel binary is the modulating signal.

What is claimed is:

1. A multiplier comprising:

operational amplifier means having a first and a second input terminal and an output terminal;

signal input means connected to a first terminal of a reference input impedance and to a first terminal of an input impedance;

reference impedance means connected between said first input terminal and a ground reference potential;

said reference input impedance and said input impedance each having a second terminal connected to said first and second input terminals respectively;

feedback impedance means connected between said output terminal and said second input terminal;

variable-impedance means connected between said second input terminal and ground for controlling the gain of said operational amplifier.

2. The multiplier as defined in claim 1 wherein said bias impedance means and said first impedance means are of equal value;

and said first impedance means is one-half the value of said feedback impedance.

3. The multiplier as defined in claim 2 wherein said variable-impedance control means is variable between the values of one-half the feedback impedance to an infinite impedance.

4. The multiplier of claim 3 further comprising control means for switching said variable control impedance in response to the condition of a binary input signal.

5. The multiplier of claim 1 wherein said variable control impedance comprises:

a plurality of digital input terminals for accepting a binary word, a plurality of switching means each connected to one of said digital input terminals;

a plurality of gain control resistors each connected to a separate one of said switching means;

said plurality of gain control resistors connected to said second input terminal;

whereby said switch means selectively engages combinations of said gain control resistors to said second input terminal so as to control the gain of said operational amplifier.

* * * * *